United States Patent [19]

Carlson et al.

[11] Patent Number: 5,269,658
[45] Date of Patent: Dec. 14, 1993

[54] COMPOSITE BLADE WITH PARTIAL LENGTH SPAR

[75] Inventors: Charles E. K. Carlson, North Shallott, N.C.; John A. Violette, Granby, Conn.

[73] Assignee: United Technologies Corporation, Hartford, Conn.

[21] Appl. No.: 633,566

[22] Filed: Dec. 24, 1990

[51] Int. Cl.$^5$ .............................................. B63H 1/26
[52] U.S. Cl. .................. 416/229 R; 416/230; 416/224; 416/225; 416/500; 29/889.71
[58] Field of Search ................ 416/223 R, 224, 226, 416/229 A, 229 R, 230, 232, 500; 29/889.6, 889.7, 889.71, 889.72

[56] References Cited

U.S. PATENT DOCUMENTS

| | | | |
|---|---|---|---|
| 2,511,862 | 6/1950 | Martin | 416/226 |
| 2,566,701 | 9/1951 | Griese | 416/500 X |
| 2,599,718 | 6/1952 | Munk | 416/229 |
| 2,767,461 | 10/1956 | Lebold et al. | 29/156.8 |
| 2,823,895 | 2/1958 | Floroff | 29/889.72 X |
| 3,647,317 | 7/1972 | Furlong et al. | 416/226 |
| 3,664,764 | 5/1972 | Davies et al. | 416/224 |
| 4,188,171 | 2/1980 | Baskin | 416/500 X |
| 4,264,278 | 4/1981 | Weingart | 416/226 |
| 4,413,860 | 11/1983 | Prescott | 416/230 X |
| 4,524,499 | 6/1985 | Grimes et al. | 29/156.8 |
| 4,627,791 | 12/1986 | Marshall | 416/132 |
| 4,648,921 | 3/1987 | Nutter, Jr. | 416/226 X |
| 4,728,263 | 3/1988 | Basso | 46/226 |
| 4,789,304 | 12/1988 | Gustafson et al. | 416/226 X |
| 4,806,077 | 2/1989 | Bost | 416/226 |
| 4,810,167 | 3/1989 | Spoltman et al. | 416/229 A |
| 4,834,616 | 5/1989 | Kasarsky et al. | 416/248 |
| 4,856,162 | 8/1989 | Graff et al. | 29/889.6 |

OTHER PUBLICATIONS

Mark's Standard Handbook for Mechanical Engineers, P11-102 (7th ed. 1978).

Primary Examiner—Edward K. Look
Assistant Examiner—Todd Mattingly

[57] ABSTRACT

A composite axial flow rotary machine blade (50) and method of blade construction is disclosed. A partial-length, spanwisely-disposed hollow spar (20) partially captures a shaped foam core (30) which extends from within the spar's cavity (26) along a substantial length of the blade (50) in a spanwise fashion. A resin-impregnated high strength, high modulus cloth (34) and graphite (32) composition overlays the spar-core assembly (36) and forms the casing (50) with airfoil regions (52, 54) of the propeller blade (10). This construction results in a rotor blade (50) with enhanced natural frequencies thereby providing for an enhanced operational speed range.

6 Claims, 2 Drawing Sheets

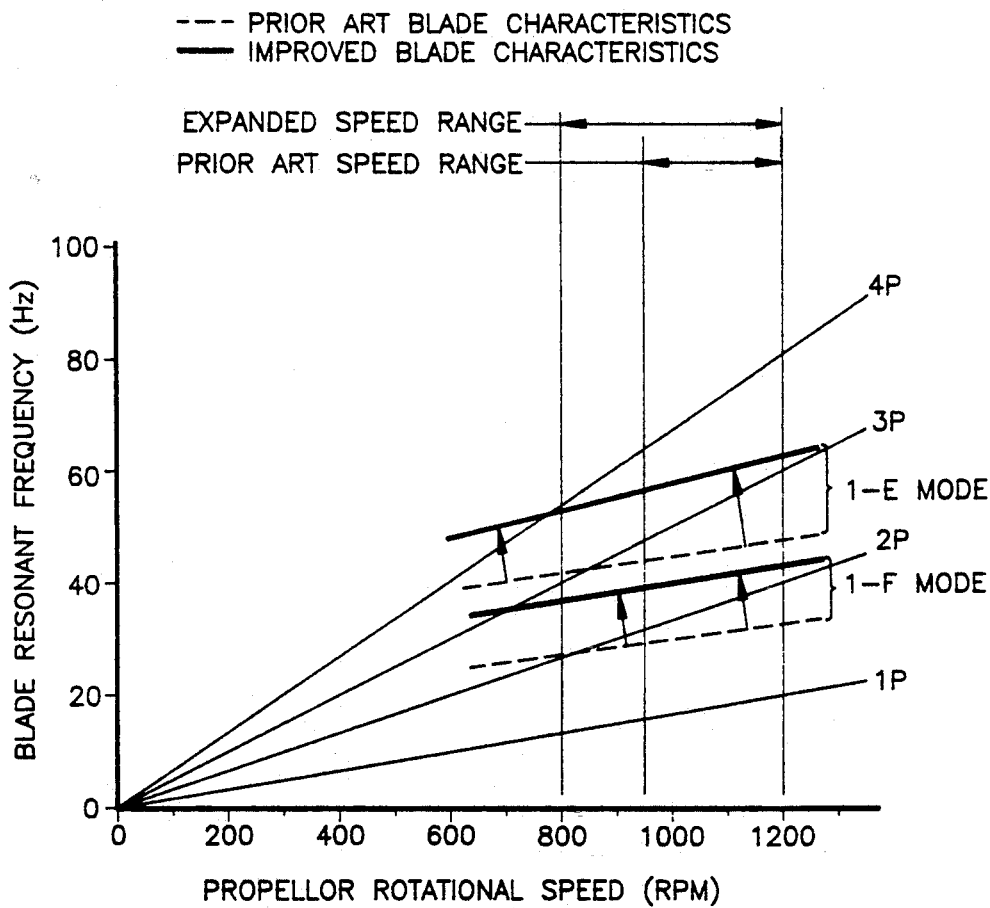

COMPOSITE BLADE WITH PARTIAL LENGTH SPAR

CROSS REFERENCE TO RELATED APPLICATION

Some of the subject matter disclosed herein is also disclosed in commonly owned copending U.S. patent application Ser. No. 632,703, filed Dec. 24, 1990, now U.S. Pat. No. 5,127,802 by Charles Carlson and John Violette entitled "Reinforced Full-Spar Composite Rotor Blade".

DESCRIPTION

1. Field of the Invention

This invention relates generally to axial flow rotary machines and more particularly to a composite rotor blade for use in such machines.

2. Background of the Invention

Rotor blades are used in numerous axial flow rotary machine applications. Such blading typically operates at moderate to high angular speeds with tip speeds often extending into and beyond the transonic speed range, depending on the particular application. A rotor blade's ability to operate safely at high angular speeds increases the operational flexibility of the rotary machine as well as that of the aircraft in which it is installed. In addition, operation at increased angular speed range also provides additional performance attributes, such as improved thrust characteristics.

A rotor blade typically responds by vibrating when excited by cyclic airloads forcing it at or near one of its natural frequencies. The amplitude and type of deflection is responsive to the magnitude of the aerodynamic excitation as well as to the proximity of the exciting frequency to the blade's natural frequency and its corresponding mode of vibration. The blade may have, for example, a natural frequency with a deflection mode of bending or of torsion. For a given blade, several different modes of vibration may also occur within a given range of the blade's angular speed. A combination of similar or dissimilar modes may even couple together, particularly at certain angular speeds. Furthermore, a rotor blade can exhibit vibratory response when the blade's natural frequency coincides with an integer order multiple of an angular speed.

Vibratory input to the rotor blade may also originate at the rotary machine as well as from changes in a given flight regime, such as climb, descent, cruise, or landing attitudes. Instabilities such as bending or torsional flutter can also occur due to aerodynamic stall phenomena. These instabilities may occur at full power in soft blades whose bending and torsional resonant frequencies are relatively low. Thus, despite recent advances in blade design, a major impediment to a desired wider range of rotor blade operating speed has been the onset of the vibration of the blade at the blade's natural frequency or integer order multiples thereof. Vibratory response of a rotor blade at these speeds may result in the reduction of lift, aerodynamic stability, and/or aerodynamic efficiency. Furthermore, excessive deflection of the blade due to such vibration may result in damage to the blade.

Although a rotor blade's natural frequencies are routinely determined during its manufacture, a continuing challenge has been posed to scientists and engineers practicing in the art to design the blade's natural frequencies away from an optimum operating envelope. An improved blade with these desired qualities will be capable of operating within a wider angular speed range which is devoid of those excitation frequencies which can cause undesired blade vibratory deflection, and can also operate flutter-free at full power.

The natural and resonant frequencies of a rotor blade occur as a function of numerous design parameters, including bending and torsional stiffness characteristics, blade mass and its overall distribution, and means of blade attachment to the hub or disc and to the propulsion source.

A rotor blade's conceptual configuration is that of a twisted, tapered cantilever beam. The blade's bending frequencies are proportional to:

$$\sqrt{\frac{k}{m}}$$

where k is proportional to the blade bending stiffness distribution and m is proportional to the blade mass distribution. Alternatively, k is proportional to EI, which is the product of the material average modulus of elasticity and the bending moment of inertia distribution of cross-sections of the blade about their neutral axes.

In a like manner, torsional frequency is dependent on blade torsional stiffness distribution, which may be determined by the overhung mass distribution of the leading and trailing edges of the blade. Given the tapered nature of a blade, the inboard regions tend to be torsionally stiff relative to the outboard regions. Thus, the outboard torsional mass and stiffness properties control the blade's first torsional mode.

In particular, a specific vibratory response of the blade at a specific resonant frequency may be identified as one of several specific modes of vibration. These modes may have flatwise, edgewise, and/or torsional bending characteristics and are typically labeled as 1F (first flatwise), 2F (second flatwise), 1E (first edgewise), 1T (first torsional), etc.

The strongest vibratory responses of blades in open rotors, such as propellers, tend to occur with the more basic primary modes of vibration at the lowest integer multiples of operating speed.

The rotor blade must also be capable of accommodating other internally and externally generated stresses, including centrifugal forces, shock, contact with foreign objects, and stress concentrations intrinsic to rotor blade geometry. It is necessary that the rotor blade accommodates these stresses at operating speeds.

Given these fundamental design considerations, it is apparent that a relatively lightweight but stiff rotor blade construction will increase a rotor blade's natural frequency and its harmonic resonances, thereby avoiding possible low integer order resonances and allowing for increased range in rotary propulsor speeds, as well as avoidance of flutter instabilities at full power.

SUMMARY OF THE INVENTION

It is an object of the present invention to provide a new design for a composite rotor blade which increases the range of allowable rotor blade operating speeds.

It is another object to provide a new design that increases a composite rotor blade's natural frequency thereby increasing the range of allowable rotor blade operating speeds.

It is a further object of the present invention to provide a relatively lightweight rotor blade with high torsional stiffness.

These and other objects will become apparent in the further course of this disclosure.

The present invention provides a composite rotor blade with increased natural frequencies as well as high bending and torsional stiffness in a relatively lightweight configuration. This is accomplished through the use of an internally located, partial length, spanwisely extending hollow high-modulus spar. A core made of a lightweight cellular substance, such as foam, is partially contained in and extends spanwisely from the spar, thereby providing a lightweight filler which primarily serves as a manufacturing mandrel to preserve the hollow spar cross-sectional shape and secondarily provides a limited degree of resistance to buckling loads and to some extent assists in transferring bending shear loads between pressure and suction sides. This sub-assembly is wrapped in a composite laminate, comprising alternating layers of spanwisely oriented fibers and angularly woven cloth. The spanwisely oriented fibers provide bending stiffness while the cloth, with fibers oriented at ±45° relative to the blade span, provide torsional stiffness to the sub-assembly. There are two paths created by this construction which serve to transfer loads to the spar. The first and primary load path is created between the outer surface of the spar and the first, innermost layer of laminated wrap comprised of high strength fibers which are wrapped about the spar. The second load path is the mechanical retention created between the blade's laminated wrap and the spar's flared distal end. Additional airfoil shaped forms made of foam are placed adjacent to the wrapped sub-assembly as precursors of the desired leading and trailing edges of the developing airfoil. The entire assemblage is then wrapped in additional cloth layers to form the finished airfoil. Graphite layers are selectively interspersed between the cloth layers to provide additional strength as needed to the resulting structure. The completed subassembly is then placed in a rigid closed mold and subjected to a partial vacuum. A liquid plastic agent, such as an epoxy resin, is then injected throughout the assembly under controlled temperature and pressure conditions to substantially complete the blade construction process. The resin encapsulates the assembly's fibrous components and aids in the formation of the desired airfoil surface.

This invention provides significant advantages over the related art. An increased rotor blade operating speed range can be assured due to the increased frequency at which excitation occurs, subject to a particular engine/propeller configuration. Furthermore, increased blade torsional stiffness reduces torsional flutter instability, and the strong, lightweight construction of the present invention provides greater power and torque capacity to the blade, resulting in greater load-carrying capability to the aircraft.

BRIEF DESCRIPTION OF THE DRAWINGS

FIG. 4 shows the correlation between a range of rotor blade resonant frequencies and a representative range of rotor blade operating speeds for a prior art blade and a blade constructed in accordance with the present invention.

DETAILED DISCLOSURE

Figure 1:
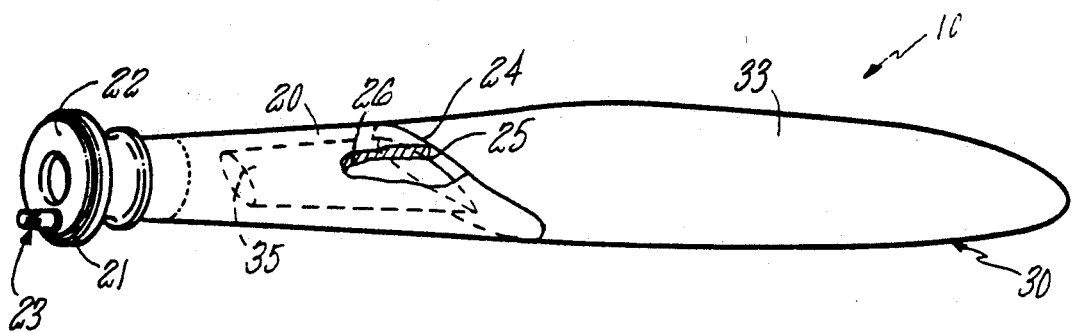
FIG. 1 illustrates the arrangement of a foam core partially captured by a hollow partial spar, according to the present invention.
Figure 2:
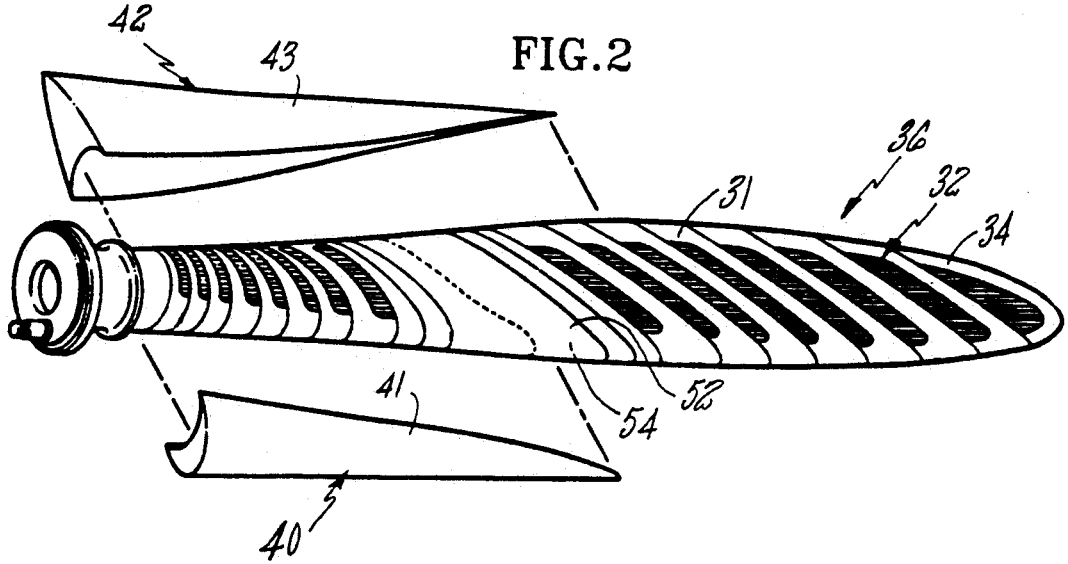
FIG. 2 is a detailed view of the foam core and spar assembly, including partial cladding of the assembly with directionally oriented graphite and cloth laminations and indicating the placement of additional foam filler adjacent to the assembly.
Figure 3:
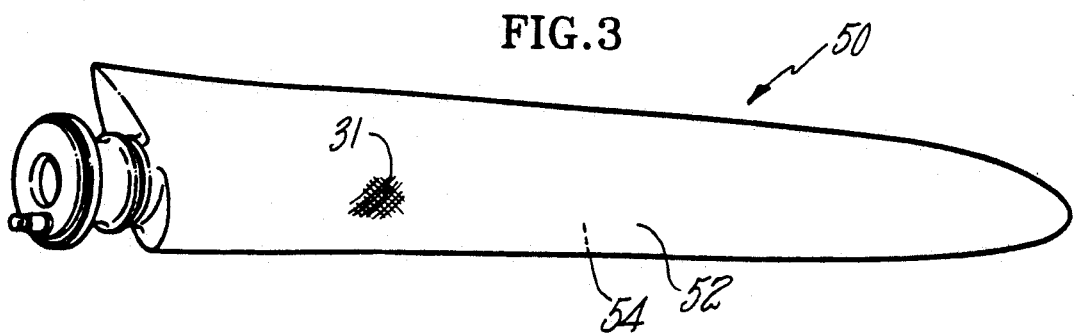
FIG. 3 shows the final form of the composite rotor blade.

Referring to FIGS. 1-3, the invention shown is a composite rotor blade generally illustrated by numeral 50 and is intended for use in an axial flow rotary machine. A composite rotor blade constructed in accordance with this invention provides for an increase in the allowable operating speed range of the blade as a result of an increased natural frequency therein as more fully described below.

Referring to FIG. 1, the composite rotary machine blade subassembly 10 has a partial length hollow steel spar 20 which has both a proximal end 22 that provides a bearing flange 21 for attaching the spar 20 to a hub (not shown), a pitch change member 23 for varying the angular pitch setting of the blade, and a distal end 24 with a cavity opening 25 to a cavity 26 contained therein. In this embodiment the spar 20 is at least 25% of the length of the airfoil span of the completed blade 50. Other embodiments may have spar-to-span ratios in the range of about 10% to about 50%. A foam core filler 30 is partially located within and extends from the cavity 26 of the hollow steel spar 20 through and beyond the opening 25 of said spar for a given length. The finished span length of the blade 50 is approximately equivalent to the cumulative length of the spar 20 and the length of the foam core filler 30 extending beyond the cavity opening 25 in a spanwise fashion.

The foam filler core 30 functions as a manufacturing mandrel for the finished composite rotary machine blade 50 and its aerodynamic surfaces. This foam filler of the core 30 has a low density closed cell configuration of regular or irregular structure, such as that of a closed-cell honeycomb structure. Typically, for example, comprised of polyurethane or another lightweight cellular substance, the foam core filler offers good structural rigidity within a relatively lightweight matrix. The foam filler core is expanded within a rigid closed mold (not shown) into which the spar 20 has been placed. The spar 20 is first coated with a layer of sprayed adhesive internally, and is coated with a wet paste adhesive externally, before being placed in the mold. The core of low density polyurethane foam fills the spar cavity 26 and extends spanwisely through the spar cavity opening 26 to a predetermined spanwise distance.

Referring to FIG. 2, a laminate wrap 31 is disposed about the bonded spar 20 and foam filler core 30 combination to form a preliminary composite assembly 36. This laminate wrap 31 is comprised of high modulus graphite layers 32 (IM7 brand graphite fibers commercially available from Hercules Aerospace Company or equivalent) interspersed among plys or layers 34 of a cloth constructed of high strength fibers such as KEVLAR ® 49 aramid fiber, commercially available from E.I. DuPont Nemours & Company, or equivalent. The cloth offers high strength, high shear modulus for torsional stiffness, and low weight characteristics in conjunction with ease and flexibility of layup in the structures formation. The directionally oriented graphite layers 32 are interspersed between the KEVLAR ® cloth layers only in the relatively flat pressure 52 and suction 54 regions of the airfoil structure, advantageously employing graphite's high strength properties. That is, preferential orientation of the graphite fibers will beneficially control, for example, flatwise or edgewise bending of the blade due to graphite's very high spanwise modulus of elasticity, relative to the modulus of elasticity of the cloth wrap 34 of the airfoil. For example, orientation of the graphite fibers substantially parallel to the longitudinal axis of the blade provides for maximum natural frequency of first mode flatwise bending resonance. Other fibrous and multiply configurations providing for blade-specific characteristics in terms of additional flatwise, edgewise, or torsional modes will be understood by those skilled in the art. In a similar and general manner, anisotropic orientation of the graphite fibers increases the resulting structure's strength in tension in the direction of fiber orientation. Additional lamination of the evolving airfoil structure utilizing this construction is then subjected to epoxy resin impregnation under controlled pressure conditions, and final airfoil surface shaping under pressure and temperature conditions, to yield the preliminary composite assembly 36. Alternatively, a foam leading edge 40 and a foam trailing edge 42 may be added to the subassembly of the preliminary composite assembly 36, followed by the lamination procedure as described above.

The hollow partial length spar 20 according to the present invention and illustrated in FIG. 1 may be constructed of high strength materials such as steel, titanium, aluminum or an alloy thereof. It should be understood by those skilled in the art that various changes in the spar, such as a non-metallic substitute for the metallic component contained therein, may be made without departing from the spirit and scope of the present invention.

The distal end 24 of the spar 20 may be flared such that its outer diameter corresponds with or is coincidental with the ultimate shape of the completed subassembly 10.

There are two paths for transferring load to the spar. The first and primary load path is the adhesive bond created between the outer surface of the spar 20 and the first (innermost) layer of the laminated wrap 31 of high strength fiber 34 which wraps around the spar 20. The second load path is the mechanical retention created between the blade's laminated wrap 31 and the flared distal end 24 of the spar 20.

Again referring to FIG. 2, it is seen that the preliminary composite assembly 36 is provided with the leading edge foam filler 40 and the trailing edge foam filler 42. Both foam fillers 40, 42 are placed adjacent to the preliminary composite assembly 36. This additional foam filler 40, 42, which includes airfoil shaped surfaces, 41, 43, respectively, mates with and completes the airfoil surfaces created in the preliminary composite assembly 36 by the laminate wrap 31. These additional structures 40, 42 may consist of the same low density foam comprising the foam filler core 30 as described above. This foam filler 40, 42, located adjacent the preliminary composite structure 36, provides the underlying structure necessary for the formation of the final airfoil configuration of the composite rotary machine blade 50 as shown in FIG. 3.

The casing 50 includes a pressure side 52 and a suction side 54 of the resulting airfoil. The use of this composite fabrication process in conjunction with the foam filler core 30 and leading edge and trailing edge foam fillers 40, 42 provides for a relatively lightweight but stiff rotor blade construction by eliminating the heavier steel spar in the radially outer portion of the blade.

An exemplary embodiment of this invention, as follows, provides the structure of a preliminary composite assembly 36. Two KEVLAR ® layers 34, each 0.009 inch thick and of 181 style cloth, are initially wrapped about the partial hollow spar 20/foam filler 30 assembly wherein the filaments of the cloth are oriented ±45° to the major axis B—B of the assembly. Six layers of two-ply graphite 32 and six additional layers of KEVLAR ® 34 are then added in alternating fashion wherein the bulk of the anisotropically oriented filaments of the graphite layers are oriented substantially parallel to the major axis of the assembly 20, 30. As discussed above, the graphite layers 32 are constrained to the relatively flat, planar regions of the developing airfoil surfaces (i.e. pressure and suction surfaces of the blade).

The resulting preliminary composite assembly 36, as wrapped, is then augmented with airfoil shaped leading edge and trailing edge foam filler 40, 42 as previously discussed. This foam filler 40, 42 is placed adjacent to the preliminary composite assembly 36 and the entire new assembly, with the exception of the exposed proximal end of the spar 22, is further wrapped with two layers of ±45° orientation KEVLAR ® followed by a double layer of KEVLAR ® with filaments oriented at 0°, 90° relative to the major axis of the blade. A final layer of ±45° KEVLAR ® is wrapped about and completes the entire structure, which is pressure injected with epoxy and is then subjected to heat and pressure necessary to create the final airfoil surfaces, including a pressure side 52 and a suction side 54.

As discussed above, an important problem in the current art is the need for a new design for a composite rotor blade which increases the allowable rotor blade operating speed range. The major impediment to this necessary but heretofore unavailable improvement is the existence of a rotor blade's primary natural frequencies within or near low integer order multiples of rotational speed in the operating range of current conventional rotor blade designs.

The natural frequencies of vibration of the blade increase with increasing spar stiffness and with decreasing weight of the propeller blade 50. This frequency of free vibration of a rotor blade is called its natural frequency. When the frequency of a forced vibration, such as the periodic fluctuations which can arise at integer multiples of an operating rotational speed, approaches this blade natural frequency, the resulting amplitude of vibration may build up to a dynamically unstable value. This condition is known as resonance.

In general, a rotor blade rotating at a given angular speed may resonate at a corresponding excitation frequency. Characteristic resonant modes include torsional, edgewise, or flatwise bending of the blade at speed as previously discussed. FIG. 4 depicts a typical distribution of two resonant modes, represented as a first flatwise (1F) mode and a first edgewise (1E) mode, occurring over a representative operating angular speed range for a given rotor blade. More specifically, increasing the natural frequencies of the individual rotor blades enables a wider operating speed range without encroachment upon one or more of the integer order cross-overs of 1P, 2P, 3P represented in FIG. 4, the lower integer order excitations typically being the strongest and causing the greatest resonant response. For example, a typical prior art rotor blade is restricted to a fully operational speed range of approximately 950 rpm to 1200 rpm so as to avoid those resonant cross-overs corresponding with, for example, the aforementioned first flatwise and first edgewise modes. In marked contrast, the rotor blade of the current invention provides a broadened fully operational speed range of approximately 800 rpm to 1200 rpm without converging with any integer cross-overs and with less response near higher order cross-overs. It will be appreciated by those skilled in the art that a particular blade resonant mode uniquely corresponds with the specific rotor configuration (in terms of its structure and composition and number of blades) and the rotor resonant modes associated therewith relative to the intended operating speed range.

According to the present invention, a spar of a given length is spanwisely disposed in a blade of some greater spanwise length. Holding all other variables constant the net result of this new configuration is a rotor blade with increased natural frequencies, and with a corresponding ability to operate within an increased operating speed range, as exemplified in FIG. 4.

The use of lightweight materials, such as foam and stiff materials such as graphite and aramid fibers, to replace dense materials such as metals, provides the less dense structure. It is not the use of the foam alone which results in the increase of the natural frequency of the blade, but rather the combined effect of the low density foam and the lightweight but stiff graphite and aramid fibers that results in the desired increase in the natural frequency of the blade.

Although the invention has been shown and described with respect to detailed embodiments thereof, it should be understood by those skilled in the art that various changes in form and detail thereof may be made without departing from the spirit and scope of the claimed invention.

We claim:

1. A rotor blade extending a given spanlength from a flange for mounting the blade to a hub spanwisely to a blade tip and having an airfoil section having a leading edge, a trailing edge and a relatively flat pressure surface extending therebetween on one side of the blade and a relatively flat suction surface extending therebetween on the opposite of the blade, the blade comprising:
    a spanwisely extending spar having a proximate end that provides the flange for attaching the spar to the hub and a distal end defining a hollow cavity therein and having a flared open end opening to the spar cavity disposed therein, said spar extending for a length ranging from 10% to 50% of the blade spanlength;
    a spanwisely extending core of lightweight foam filler extending from a proximate end disposed within the spar cavity through the opening and beyond the flared open end of the distal end of the spar a predetermined spanwise distance to a distal end of the blade tip;
    a first laminate wrap formed of a plurality of cloth layers disposed about the spar and the core, the first laminate wrap having a plurality of layers of high strength fibers interspersed among the plurality of cloth layers so as to spanwisely extend along the pressure and suction surfaces of the blade, thereby forming a preliminary composite assembly;
    additional foam filler shaped to mate with the preliminary composite assembly to form portions of the blade's leading and trailing airfoil edges; and
    a second laminate wrap formed of a plurality of cloth layers disposed about the preliminary composite assembly and proximately located shaped foam filler.

2. The blade as recited in claim 1, wherein the cloth layers consist essentially of woven high strength fibers.

3. The blade as recited in claim 1, wherein the high strength fibers are graphite fibers.

4. The blade as recited in claim 1, wherein the spar is of metallic composition.

5. The blade as recited in claim 1, wherein the core consists essentially of low density foam.

6. The blade as recited in claim 1, wherein the spar is at least one-quarter the length of the airfoil span of the blade.

* * * * *